US008469175B2

(12) United States Patent
Lanzki et al.

(10) Patent No.: US 8,469,175 B2
(45) Date of Patent: Jun. 25, 2013

(54) METHOD AND DEVICE FOR OPERATING A PASSENGER TRANSPORT INSTALLATION

(75) Inventors: Winfried Lanzki, Unna (DE); Andreas Tautz, Waltrop (DE); Carsten Rolf, Sprockhoevel (DE); Heinrich Zeiger, Muenster (DE); Alfred Thiel, Lauda-Koenigshofen (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/355,747

(22) Filed: Jan. 23, 2012

(65) Prior Publication Data

US 2012/0186940 A1 Jul. 26, 2012

Related U.S. Application Data

(63) Continuation of application No. PCT/DE2010/000842, filed on Jul. 21, 2010.

(30) Foreign Application Priority Data

Jul. 23, 2009 (DE) ........................ 10 2009 034 345

(51) Int. Cl.
*B65G 43/00* (2006.01)

(52) U.S. Cl.
USPC .......................................................... 198/322

(58) Field of Classification Search
USPC ................................. 198/322, 323, 330, 334
See application file for complete search history.

(56) References Cited

U.S. PATENT DOCUMENTS

| | | | | |
|---|---|---|---|---|
| 3,583,325 | A * | 6/1971 | Melin | 198/324 |
| 3,677,388 | A * | 7/1972 | Boltrek et al. | 198/833 |
| 3,707,220 | A * | 12/1972 | Boltrek et al. | 198/330 |
| 4,397,096 | A * | 8/1983 | Kraft et al. | 33/655 |
| 4,589,539 | A * | 5/1986 | Boltrek et al. | 198/331 |
| 4,600,865 | A * | 7/1986 | Caputo | 318/274 |
| 4,738,346 | A * | 4/1988 | Matsueda et al. | 198/330 |
| 6,155,401 | A * | 12/2000 | Lunardi et al. | 198/330 |

(Continued)

FOREIGN PATENT DOCUMENTS

| | | |
|---|---|---|
| BE | 563031 | 6/1960 |
| JP | 03147696 A | 6/1991 |
| JP | 7252073 | 10/1995 |
| WO | WO-2010/115410 A2 | 10/2010 |

OTHER PUBLICATIONS

International Search Report of PCT/DE2010/000842 Filed Dec. 17, 2010 With an English Translation.

*Primary Examiner* — Gene Crawford
*Assistant Examiner* — Keith R Campbell
(74) *Attorney, Agent, or Firm* — Venable LLP; Robert Kinberg

(57) ABSTRACT

A method for controlling an installation for a revolving passenger transport comprised of steps or pallets moving along a transport path that includes a plurality of drives. At least one drive is arranged in a reversing area and at least one further drive is arranged in an area of the transport path. Each drive is actively connected to a frequency converter. All of the frequency converters are monitored by a higher-order control. A defined drive pattern is memorized in the higher-order control. Measured values of the drives are transmitted to the higher-order control by individual frequency converters. The measured values are compared in the higher-order control with respect to each other. In case of divergences from the memorized drive pattern of the respective frequency converter, the respective frequency converter which diverges from a comparative value is corrected with aid of the higher-order control.

4 Claims, 5 Drawing Sheets

U.S. PATENT DOCUMENTS

| | | | | |
|---|---|---|---|---|
| 6,161,674 | A | 12/2000 | Aulanko et al. | |
| 6,342,768 | B1 * | 1/2002 | van der Heiden | 318/39 |
| 6,640,958 | B2 * | 11/2003 | Postlmayr | 198/321 |
| 6,766,893 | B2 * | 7/2004 | Neumann et al. | 198/322 |
| 7,137,500 | B2 * | 11/2006 | Fargo | 198/330 |
| 7,296,671 | B2 * | 11/2007 | Pietz | 198/330 |
| 7,357,240 | B2 * | 4/2008 | Ogimura et al. | 198/330 |
| 7,600,627 | B2 * | 10/2009 | Ishikawa et al. | 198/330 |
| 8,006,822 | B2 * | 8/2011 | Tschuemperlin | 198/322 |
| 2003/0000801 | A1 * | 1/2003 | Spannhake et al. | 198/322 |
| 2006/0027438 | A1 * | 2/2006 | Fargo | 198/330 |
| 2008/0053788 | A1 * | 3/2008 | Ishikawa et al. | 198/330 |

* cited by examiner

METHOD AND DEVICE FOR OPERATING A PASSENGER TRANSPORT INSTALLATION

CROSS-REFERENCE TO RELATED APPLICATIONS

The application is a continuation of International Application No. PCT/DE2010/000842, filed Jul. 21, 2010, designating the United States and claiming priority to German Application No. DE 10 2009 034 345.8, filed Jul. 23, 2009, the disclosures of both applications being incorporated herein by reference in their entireties.

BACKGROUND OF THE INVENTION

The invention relates to a method for controlling an installation for a passenger transport which is provided with several drives, in particular an escalator or a moving walkway.

Japanese patent document JP 03147696 A relates to an escalator having horizontally extending transport sections which are connected to each other by transport sections which extend in an inclined manner. A drive is provided in one of the reversing areas of the transport. Another drive is arranged between inclined transport sections in the area of a horizontally extending transport section.

U.S. Pat. No. 4,738,346 discloses a drive unit for passenger conveying systems, comprising a linear motor which is provided in the inclined transport section of the passenger conveying system. Herein, the linear motor is triggered electronically.

Japanese patent document JP 07-252073 describes a control device of a passenger conveying installation, comprising two drive motors which are triggered via frequency converters. Herein, the frequency converters are monitored by a control device.

Belgium Patent document BE 563031 discloses a generic passenger conveying installation.

Finally, U.S. Pat. No. 6,161,674 discloses a passenger conveying installation which is driven by a motor which comprises relatively small axial dimensions.

SUMMARY OF THE INVENTION

It is an object of the invention to improve a method for controlling an installation for a passenger transport which is provided with a plurality of drives such that an optimum distribution of the driving power of the individual drives can be assured in the area of the entire transport path.

It is a further object of the invention to realize a drive which can also cover relatively long transport distances over different heights and with different geometric designs of the installation.

The above and other object are accomplished by a method for controlling an installation for a revolving passenger transport, such as an escalator or moving walkway comprised of a steps or pallets moving along a transport path, which includes a plurality of drives, with at least one drive being arranged in a reversing area and at least one further drive being arranged in an area of the transport path, wherein, in one embodiment, the method comprises: actively connecting each drive to a frequency converter; monitoring all frequency converters by a higher-order control connected to the frequency converters; memorizing a defined drive pattern in the higher-order control; transmitting measured values of the drives to the higher-order control by individual frequency converters; comparing the measured values in the higher-order control with respect to each other; and in case of divergences from the memorized drive pattern of the respective frequency converter, correcting with the higher-order control, the respective frequency converter which diverges from a comparative value.

According to a further aspect of the invention, there is provided a control device for a passenger transport installation, such as an escalator or moving walkway, comprising: a plurality of electric motor drives located in an area of the passenger transport; wherein each electric motor drive is connected to at least one mechanical gear; frequency converters actively connected, respectively, to the electric motor drives; and a higher-order control actively connected to each frequency converter via a data line; wherein the passenger transport installation has a form of a spatial curve arc.

The method according to the invention is a closed speed-controlled drive system having a higher-order control. The higher-order control receives information of the drives directly or via the associated frequency converters. For this, a pulse generator is mounted on each drive.

The following is meant by higher-order control:

- the higher-order control is designed as a separate component outside the frequency converter,
- the higher-order control is integrated within a frequency converter,
- the higher-order control is part of the general control of the passenger conveying installation.

The man skilled in the art will select the kind of the higher-order control in dependence on the respective application.

Since a closed speed-controlled system is concerned here, the orientation, that is the position, of the individual drives with respect to each other has to be first determined, such that the drive wheels (chain starwheels/chain wheels) of all drives permanently have a positive fit connection to the chain.

The position of the drives with respect to each other can for example be determined by at least one reference run of the passenger transport installation.

The memorized position of the drives with respect to each other is used as a reference for further operation. The higher-order control controls the system such that the speed divergence of the drives with respect to each other is kept as small as possible.

The electric motors can be synchronous or asynchronous motors, wherein direct drives without mechanical gears can also be used to implement the invention.

BRIEF DESCRIPTION OF THE DRAWINGS

The subject of invention is represented in the drawing by means of an exemplary embodiment and is described as follows. Herein.

DETAILED DESCRIPTION OF THE INVENTION

Figure 1:
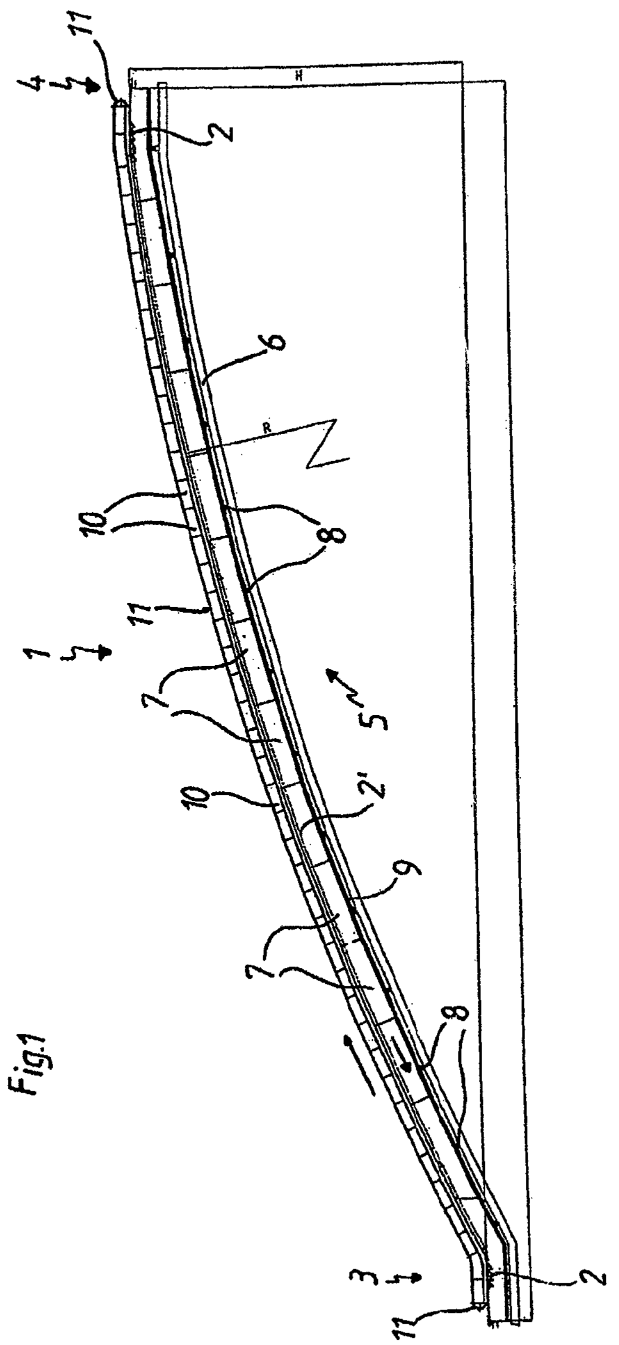
FIG. 1 is a schematic diagram of an installation for the passenger transport.

FIG. 1 is a schematic diagram which shows an installation for the passenger transport 1 which in this example is an escalator. However, the passenger transport could alternatively be a moving walkway, so far as the legally prescribed inclination angles are observed. A step belt 2' composed of a plurality of steps 2 is only schematically shown. The different directions of transport (upwards, downwards) are shown by arrows. A drive (not shown in FIG. 1) for the step belt 2' can be positioned in the area of the entrance section 3 and/or exit section 4. In this example, the left lower part of FIG. 1 shall represent an entrance section 3 and the right upper part of FIG. 1 shall represent an exit section 4. A transport section 5 which is formed as a spatial curve arc extends between the lower entrance section 3 and the upper exit section 4. In this example, a curve arc shall be present, which comprises a pre-determinable radius R of for example 210 m. In this example, an arched substructure 6 which receives the transport section 5 is provided on the side of the building. As already stated, on certain conditions the transport section 5 can also be a cantilever type. The transport section 5 itself is formed by a plurality of linear framing sections 7. Each framing section 7 can have bearings 8, by which it can be supported in an adjustable manner on the surface 9 of the substructure 6. As represented in greater detail in FIGS. 2 and 3, the framing sections 7 can be of any design, i.e. they can also be curved.

Balustrade elements 10, for example in the form of glass panes, are placed on the respective framing section, on which balustrade elements a handrail 11 is moved in the direction of transport. In the entrance section 3 and the exit section 4, the running direction of the handrail 11 will be reversed, analogously to the step belt 2'. If required, the handrail 11 can be driven by the step belt drive or interacts with its own drive. In this example, the difference in height H between the entrance section 3 and the exit section 4 shall be approximately 21.4 m, whereas the total length L of the escalator is approximately 79 m.

Figure 2:
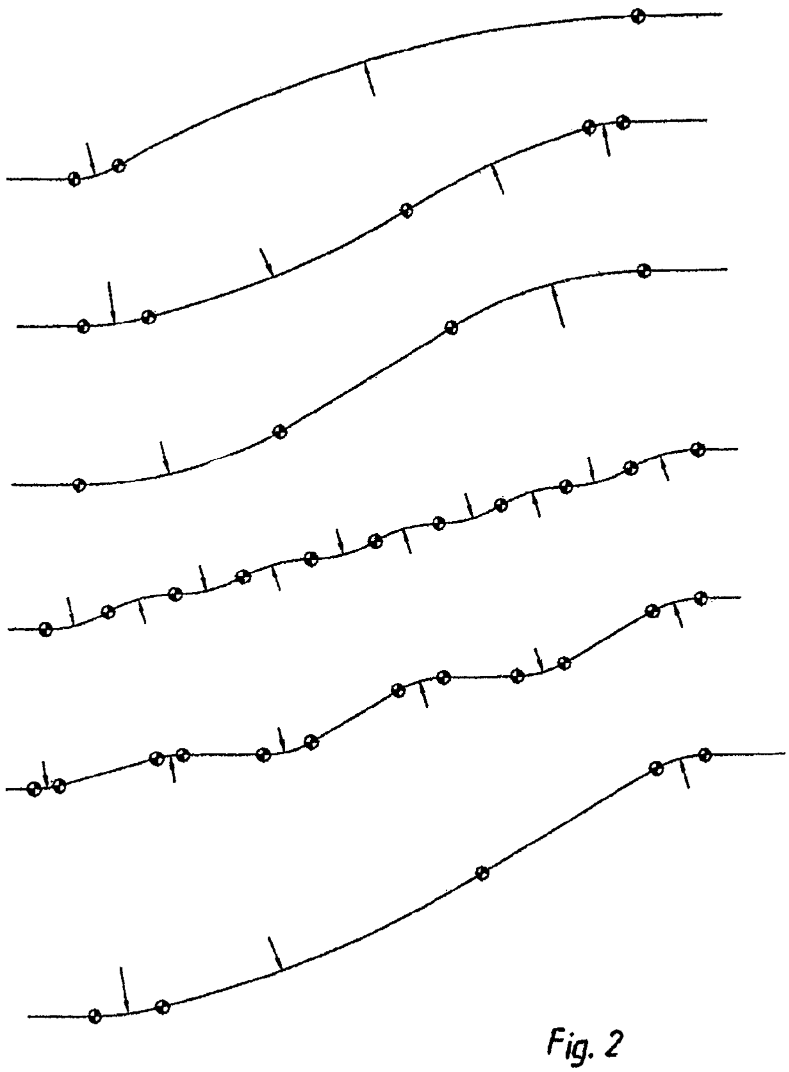
FIG. 2 shows line-shaped guidances of transport sections of an escalator.

FIG. 2 shows, in the form of lines, some technically realizable options to connect entrance or exit sections of an escalator having transport sections with respect to each other. Different convex and concave curve sections are used. The different radii are represented by arrows. As already explained, the radii can have different sizes. If required, curve-like transport sections can be combined with linear transport sections.

Figure 3:
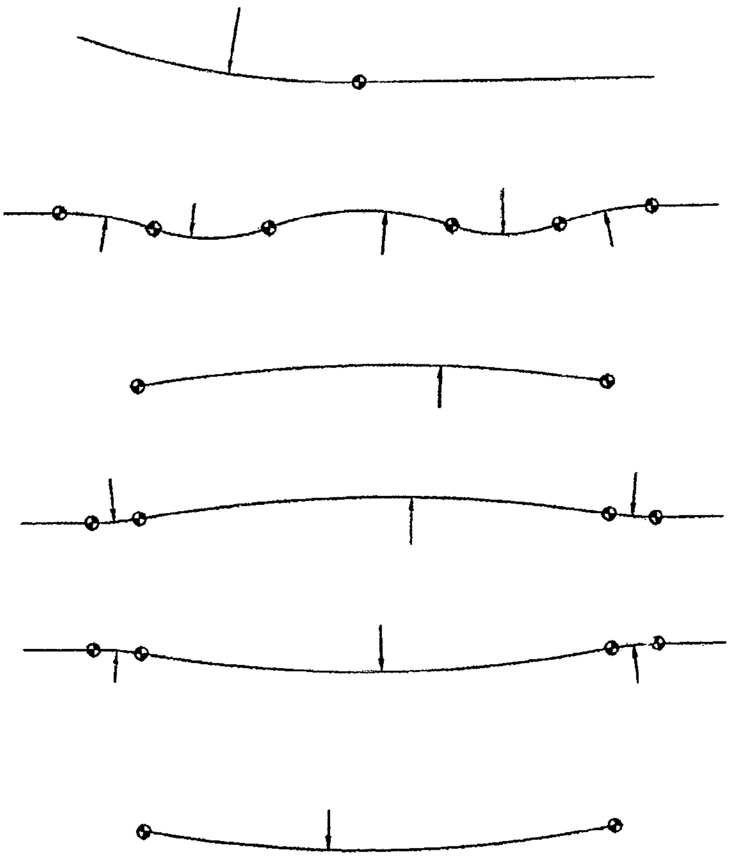
FIG. 3 shows line-shaped guidances of transport sections of a moving walkway.

FIG. 3 shows, in the form of lines, some technically realizable options to connect entrance or exit sections of a moving walkway having transport sections with respect to each other. For moving walkways it has to be taken care that the legally prescribed inclination angles are observed.

Figure 4:
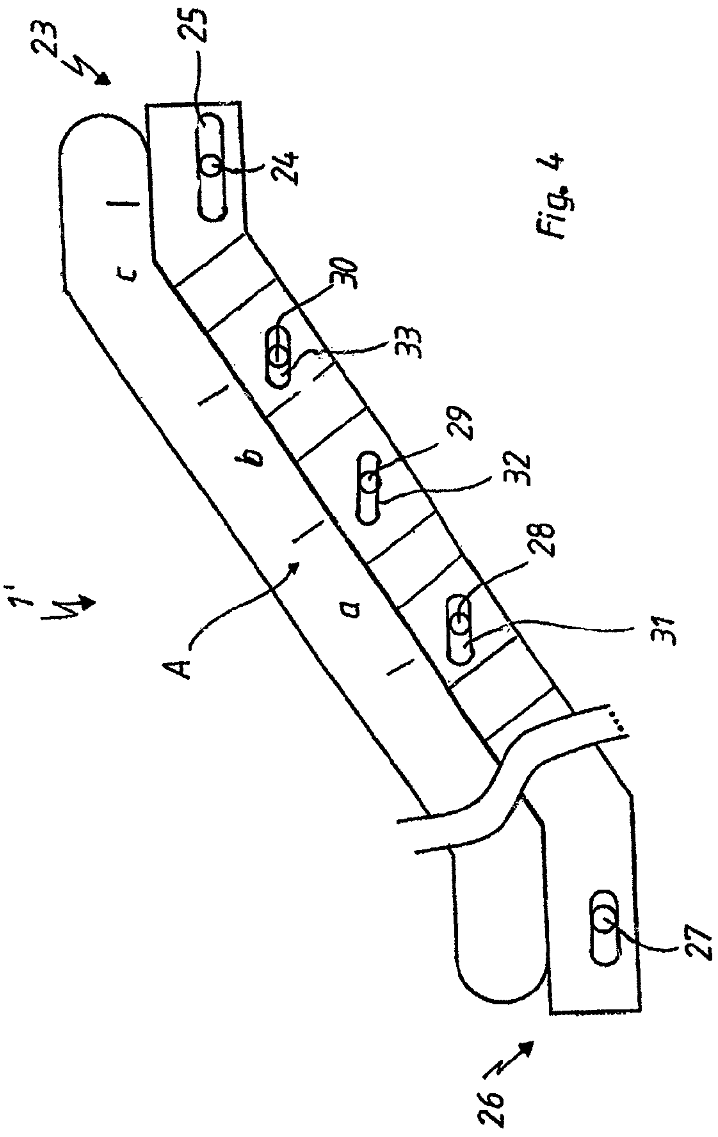
FIG. 4 is a partial representation of the drive system for an excessively long escalator.

FIG. 4 is a schematic diagram which shows an excessively long escalator 1'. All the components which are represented here can also be transferred to a passenger transport installation 1 according to FIG. 1. In the example according to FIG. 4, a first electric motor 24 including a schematically shown reducing gear 25 is positioned in the upper reversing area 23 of the device 1'.

In the lower area 26 of the device 1', an additional handrail drive 27 is provided in this example.

The device 1' can be used for covering any transport heights and/or transport distances, in that in the area of the inclined transport path A at least one further electric motor 28, 29, 30 including reducing gears 31, 32, 33 will be positioned between unshown plate link chains which form part of the transport. This arrangement permits to realize an extremely space-saving construction. It is not represented here that the electric motor 24 respectively the reducing gear 25 provided in the area 23 interacts with two reversing elements which are formed by chain starwheels and which reverse the moving direction of the plate link chains. All the electric motors 24, 28, 29, 30 are dimensioned to have approximately the same power, wherein each electric motor 24, 28, 29, 30 is used for the motion of the step belt 2' (FIG. 1) over a defined section a, b, c of the transport path A.

The electric motors 28 through 30 respectively the reducing gears 31 through 33 interact with neither represented chain wheels which are in engagement with the plate link chains in the transport section a, b, c and which are exclusively responsible of the linear motion of the step belt 2'.

Figure 5:
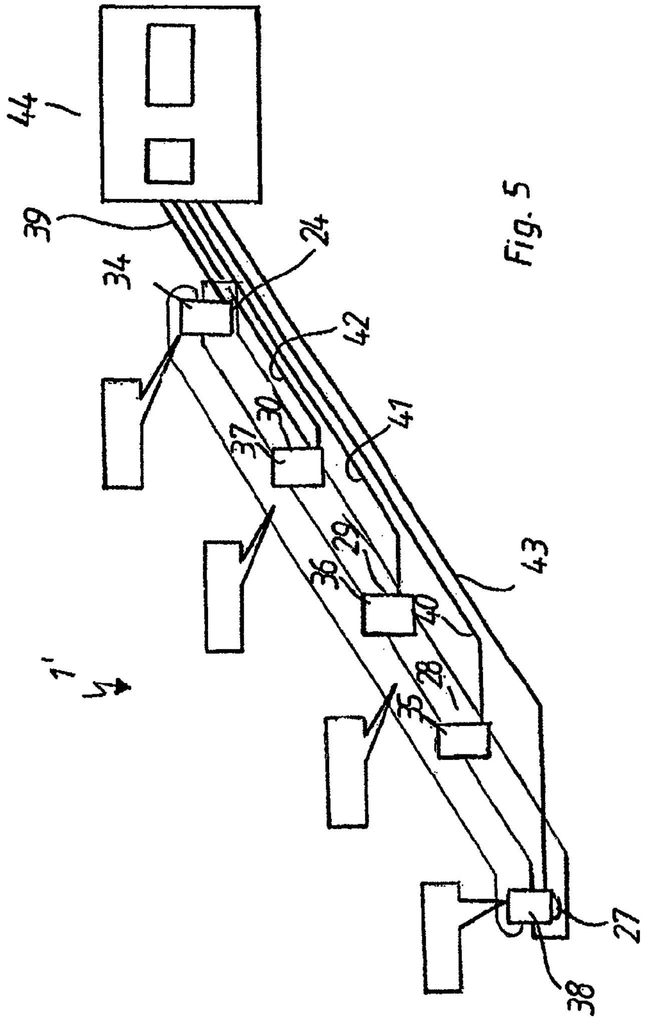
FIG. 5 is a schematic diagram of a control scheme for the drive system according to FIG. 4.

FIG. 5 is a schematic diagram which shows a control scheme for the drive system represented in FIG. 4. Each electric motor 24, 28, 29, 30 interacts with a frequency converter 34, 35, 36, 37. The handrail drive 27 is also provided with a frequency converter 38. The frequency converters 34 through 38 are actively connected to a higher-order control 44 via corresponding data lines 39, 40, 41, 42, 43.

The control system formed by the higher-order control 44 as well as the frequency converters 34 through 37 is a closed speed-controlled drive system. The higher-order control 44 receives the information from the drives 24, 28 through 30 directly or via the associated frequency converters 34 through 37. For this, a pulse generator (not shown) is mounted on each drive 24, 28 through 30. For determining a reference pattern, by means of which the position of the drives 24, 28 through 30 with respect to each other is determined, either a dynamic or a static reference run is realized in dependence of the respective control method. This reference pattern is memorized in the higher-order control 44 and used as reference for the further operation of the escalator. The higher-order control 44 controls the drive system such that the divergences of the drives 24, 28 through 30 are defined among one another.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

The invention claimed is:

1. A method for controlling an installation for a revolving long passenger transport, including an escalator or moving walkway comprised of a steps or pallets moving along a transport path, which includes a plurality of drives, with at least one drive being arranged in a reversing area and at least one further drive being arranged in an area of the transport path, the method comprising:

actively connecting each drive to a frequency converter;

monitoring all frequency converters by a higher-order control connected to the frequency converters;

determining the position of the drives with respect to each other by at least one reference run of the installation for generating a drive pattern;

memorizing the generated drive pattern in the higher-order control;

transmitting measured speed values of the drives to the higher-order control by the individual frequency converters;

comparing the measured speed values in the higher-order control with respect to each other; and in case of divergences from the memorized drive pattern of the respective frequency converter, correcting with the higher-order control, the respective frequency converter which diverges from a comparative value.

2. The method according to claim 1, further including designing the drives to have essentially the same power.

3. The method according to claim 1, further including forming each drive by at least one electric motor and designing each electric motor with respect to a power thereof, for a pre-determinable transport section of the revolving transport and afterwards realizing a motion of the transport with a further drive.

4. The method according to claim 1, including using positions of the drives memorized in the higher-order control as reference for a normal running operation of the installation; and controlling the higher-order control to control the individual drives to optimize the divergences of the drives with respect to each other.

* * * * *